July 17, 1934.  A. HEBNER  1,967,027
SPRING SHACKLE
Filed June 10, 1933
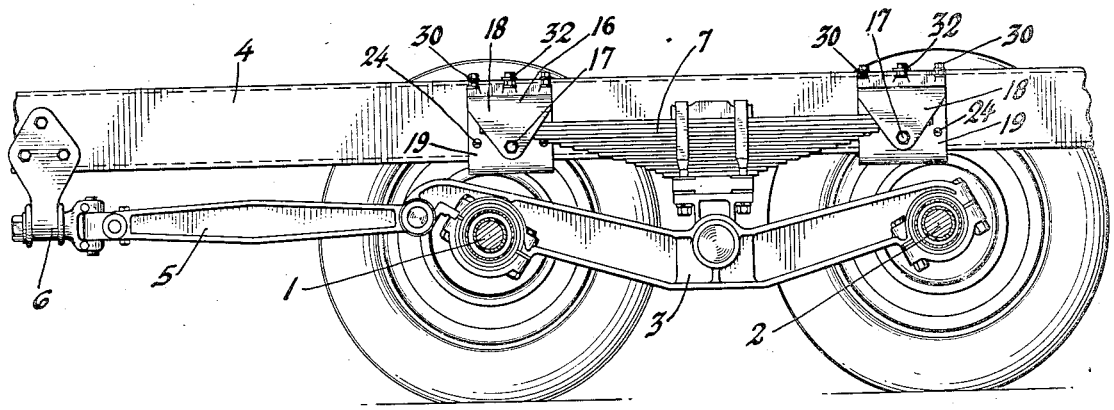
Fig. 1
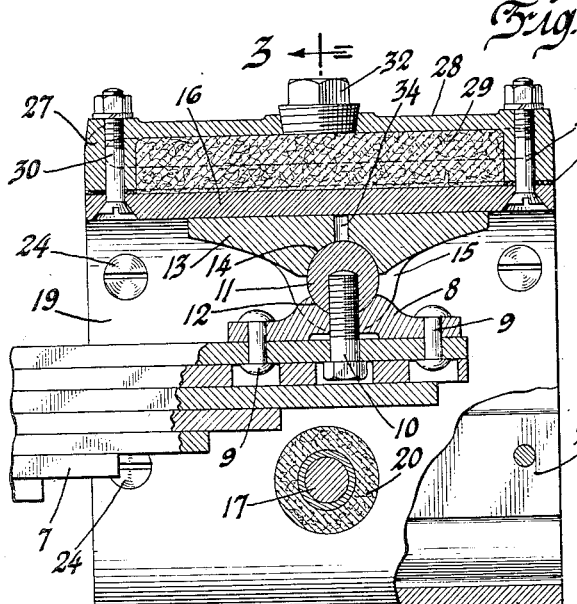
Fig. 2
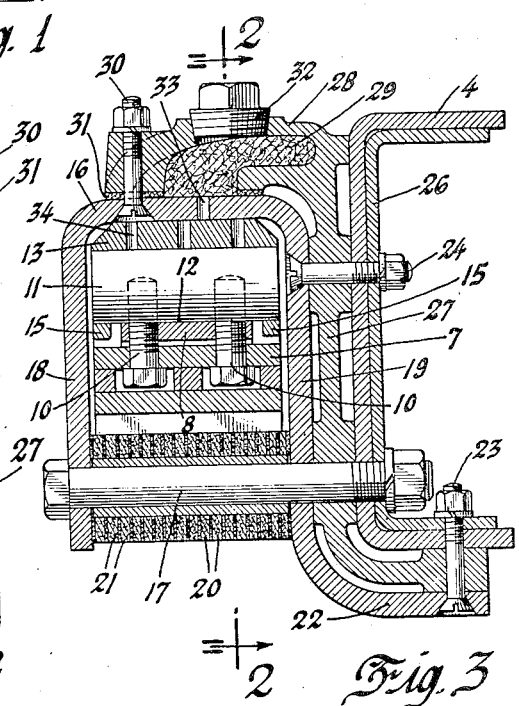
Fig. 3
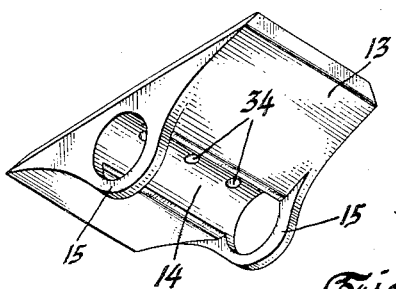
Fig. 4
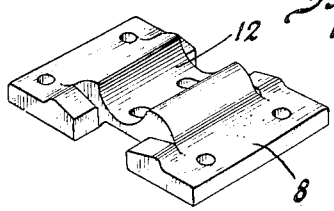
Inventor
Arthur Hebner
By Blackmore, Spencer & Hurd
Attorneys Patented July 17, 1934

1,967,027

UNITED STATES PATENT OFFICE 1,967,027

SPRING SHACKLE

Arthur Hebner, Pontiac, Mich., assignor to Yellow Truck & Coach Manufacturing Company, Pontiac, Mich., a corporation of Maine Application June 10, 1933, Serial No. 675,181

4 Claims. (Cl. 267—56)

This invention relates to motor vehicles, and more particularly to the suspension of the vehicle load carrying frame upon its running gear.

It is among the objects of the invention to provide an improved spring suspension arrangement especially adapted for mounting a vehicle frame upon tandem axles, wherein the load supporting spring is entirely relieved from driving thrust transmitted between the axles and frame.

Another object is to provide an improved spring end connection permitting relative pivotal and longitudinal movements of a multiple leaf spring to accommodate deflection as a result of either load or road shock.

A further object is to provide in a simple and economical fashion an improved pivotal mounting for a bearing shoe on the end of the load supporting spring and a frame bracket cooperating with the shoe and embodying in a lubricant reservoir for supplying lubricant to associated bearing surfaces together with a retainer or buffer for holding the spring end against accidental displacement.

Additional objects and advantages will be apparent upon an examination of the accompanying drawing, wherein Figure 1 is a fragmental side elevation of a chassis frame suspended on tandem axles, the axles being shown in section for clearness of illustration. Figure 2 is a longitudinal section of the spring end connection and is taken as on line 2—2 of Figure 3. Figure 3 is a transverse section of the spring end connection taken on line 3—3 of Figure 2, and Figure 4 illustrates in perspective a mounting plate for the end of the spring and a bearing shoe to be pivotally mounted on the plate.

Referring to the drawing, the reference numerals 1 and 2 indicate a pair of tandem axles having road wheels at opposite ends. In the drawing the axles illustrated are of the driving type, but it is obvious that non-driving or dead axles could be used. The axles are tied together at proper distances apart by a pair of walking beams or equalizing levers 3, spaced transversely of each other and suitably connected to the chassis frame 4 for the transmission of driving thrust therebetween. In the present case the thrust transmitting connection consists of a radius rod 5 pivotally connected at one end to an adjacent end of the walking beam 3, and at its opposite end by a universal joint to a frame bracket 6. Each side of the chassis frame 4 is supported upon the opposite ends of a multiple leaf spring 7, pivotally mounted at an intermediate point to the central portion of the walking beam 3.

As shown particularly in Figures 2 and 3, each end of the leaf spring 7 is provided with a plate 8 secured by rivets 9 or otherwise to the main leaf of the spring assembly, in which case the next succeeding leaf is provided with apertures to receive the heads of the rivets. Similar apertures may be provided in the second leaf to receive the heads of a pair of bolts or studs 10 extending upwardly through the main leaf and through the mounting plate 8 into engagement with an intermediate portion of a cylindrical pin or bolt 11, which is seated within a concave or grooved portion 12 of the plate 8. This pin provides a pivotal bearing for a sliding shoe 13 having a groove or recess 14 receiving the pin and a pair of apertured ears or side flanges 15 into which the opposite ends of the pin 11 project to hold the shoe in place.

The shoe 13 bears against the underside of the base portion 16, of a substantially inverted channel or U-shaped frame bracket, whose open space is closed by a pin or bolt 17 connecting the dependent legs 18 and 19, respectively. This pin 17 prevents accidental displacement of the spring end away from the bearing surface of the base 16, and in order to cushion any such movement a resilient buffer may be sleeved on the pin, which in the present case is illustrated as consisting of a series of washers 20 of rubber or the like, separated by intervening discs 21 of fabric.

The dependent leg 19 of the bracket terminates in a lateral extension 22, which may be fastened by one or more securing studs 23 to the bottom flange of the chassis frame member. Similar fastening bolts 24 may be provided near the upper end of the leg 19. For the purpose of rigidity, suitable reinforcement members 26 may be inserted within the channeled frame member adjacent the location of the frame bracket or brackets.

The mounting bolts 23—24 serve also to fasten an intermediate bracket member 27 of substantially Z-shape in section, whose upper lateral flange 28 is recessed to provide a lubricant cavity 29. Attachment bolts 30 secure the outer end of the leg 28 to the base 16 of the main bracket and hold in place an intermediate sealing gasket 31. A closure plug 32 is provided by which the lubricant within the reservoir 29 may be replenished from time to time, and the reservoir is preferably filled with waste or other suitable absorbent material, which will soak up the lubricant and feed it to the parts to be lubricated in accordance with requirements. To direct the lubricant to the bearing surfaces, the base 16 may be provided with one or more openings 33 leading to the sliding bearing surface for the shoe 13, and the shoe may similarly be provided with one or more openings 34 for conducting lubricant to the bearing surface of the pivot pin 11.

It will be seen that the load supporting spring 7 is entirely relieved from any driving thrust as well as strain due to the irregular movement of the tandem wheels over road bumps and that it will be permitted a pivotal movement on the shoe 13 by reason of the pivot pin 11 upon deflection, and that any longitudinal movement of the spring ends will be readily accommodated by the bearing engagement of the shoe 13 on the surface of the frame bracket, both shoes being maintained at all times in engagement with their respective frame brackets by the distance rods 5.

I claim:

1. In a motor vehicle, the combination with a frame and a load supporting spring, of an inverted channel shape frame bracket adapted to receive the spring end, a resilient buffer at the open end of the bracket to retain the spring end therein, a pivot pin fixed intermediate its ends to the spring, a bearing shoe pivotally mounted on the pin and provided with side flanges apertured to receive opposite ends of the pin, a lubricant reservoir associated with a portion of the bracket that slidably engages said shoe and means to feed lubricant to the shoe surfaces engaging said bracket and the pivot pin.

2. In a motor vehicle, a load supporting spring, a frame bracket comprising a pair of interconnected members, one of which has a lubricant cavity therein and the other of which closes said cavity and has a pair of dependent arms to receive the end of said spring therebetween, a slider shoe bearing on the underside of the last mentioned member and having a semi-cylindrical seat therein, a hinge pin having a bearing in said seat, a mounting plate for said pin, means fixedly anchoring said plate to the end of the spring, and means extending through said shoe and the bearing member of the bracket to feed lubricant from said cavity to both the sliding and pivotal bearing surfaces.

3. In a motor vehicle, a load supporting spring, a frame bracket of substantially inverted U-shape adapted to receive the end of the spring, a buffer at the open end of said U-shaped bracket to retain the spring against movement through said end, a pair of hinge plates, a hinge pin connecting said plates, means to rigidly mount the one of said plates on the end of said spring for positioning the other plate in sliding bearing engagement with the underside of said bracket.

4. In a motor vehicle, a load supporting spring, a frame bracket of substantially inverted U-shape adapted to receive the end of the spring, a buffer at the open end of said U-shaped bracket to retain the spring against movement through said end, a seating plate on the end of the spring, a cylindrical pin seated on the plate with opposite ends projecting beyond the sides of the plate, a slider shoe bearing on the underside of the base of said bracket and having dependent ears projecting beside said plate with openings therein to receive said pin ends.

ARTHUR HEBNER.